US012696203B2

(12) United States Patent
Guo

(10) Patent No.: US 12,696,203 B2
(45) Date of Patent: Jul. 28, 2026

(54) INFORMATION TRANSMISSION METHOD AND APPARATUS, AND COMMUNICATION DEVICE AND STORAGE MEDIUM

(71) Applicant: Beijing Xiaomi Mobile Software Co., Ltd., Beijing (CN)

(72) Inventor: Shengxiang Guo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 342 days.

(21) Appl. No.: 18/568,018

(22) PCT Filed: Jun. 18, 2021

(86) PCT No.: PCT/CN2021/101055
§ 371 (c)(1),
(2) Date: Dec. 7, 2023

(87) PCT Pub. No.: WO2022/261973
PCT Pub. Date: Dec. 22, 2022

(65) Prior Publication Data
US 2024/0137877 A1 Apr. 25, 2024

(51) Int. Cl.
*H04W 52/36* (2009.01)
*H04W 52/34* (2009.01)

(52) U.S. Cl.
CPC ....... *H04W 52/367* (2013.01); *H04W 52/346* (2013.01)

(58) Field of Classification Search
CPC ............. H04W 52/367; H04W 52/346; H04W 52/146; H04W 92/10; H04W 92/18;
H04W 28/0221; H04W 52/265; H04W 52/383; H04W 72/0473; H04W 4/40; H04W 52/241; H04W 72/51; H04W 72/535; Y02D 30/70
See application file for complete search history.

(56) References Cited

U.S. PATENT DOCUMENTS

| | | | |
|---|---|---|---|
| 2022/0022029 A1* | 1/2022 | Di Girolamo | ........ H04W 60/00 |
| 2022/0070972 A1* | 3/2022 | Belleschi | .............. H04W 84/20 |
| 2024/0187870 A1* | 6/2024 | Zhang | ................... H04W 76/14 |

FOREIGN PATENT DOCUMENTS

JP 2020-536450 A 12/2020

OTHER PUBLICATIONS

Notice of Reasons for Refusal issued by the Japanese Patent Office on Nov. 1, 2024, in corresponding Application No. JP 2023-576413, 12 pages.
International Search Report and Written Opinion of International Application No. PCT/CN2021/101055, dated Dec. 27, 2021, 12 pages.
Xiaomi, "on V2X HPUE power class signaling", 3GPP TSG-RAN WG4 Meeting # 98-e, R4-2106296, Electronic Meeting, Jan. 25-Feb. 5, 2021, 2 pages.

(Continued)

*Primary Examiner* — Fayyaz Alam
(74) *Attorney, Agent, or Firm* — Finnegan, Henderson, Farabow, Garrett & Dunner, L.L.P.

(57) ABSTRACT

An information transmission method is performed by a user equipment (UE), and includes: transmitting power indication information, wherein the power indication information indicates UE power classes of a plurality of interfaces in a working frequency band.

17 Claims, 5 Drawing Sheets

(56)                References Cited

OTHER PUBLICATIONS

Moderator (Huawei, HiSilicon), "Email discussion summary for [98-bis-e][136] NRSL_enh_Part_3", 3GPP TSG-RAN WG4 Meeting # 98-bis-e, R4-2105473, Electronic Meeting, Apr. 12-Apr. 20, 2021, 22 pages.

Extended European Search Report Issued in Application No. 21945556.5 dated Jun. 27, 2024, 9 pages.

"Email discussion summary for [99-e][144] NRSL_enh_Part_3", Moderator (Huawei, HiSilicon), 3GPP TSG-RAN WG4 Meeting #99-e, R4-2107670, Electronic Meeting, May 19-27, 2021, 20 pages.

"R17 SL PC2", OPPO, 3GPP TSG-RAN WG4 Meeting #99-e, R4-2110833, Electronic Meeting, May 19-27, 2021, 1 page.

"MPR for NR V2X intra-band con-current operation with Uu", LG Electronics, 3GPP TSG-RAN WG4 Meeting #99-e, R4-2109702, Electronic Meeting, May 19-27, 2021, 11 pages.

* cited by examiner information transmission apparatus 200 third receiving module 210 second determining module 220 third determining module 230 fourth determining module 240 third transmitting module 250 fourth transmitting module 260 fourth receiving module 270 fifth determining module 280

INFORMATION TRANSMISSION METHOD AND APPARATUS, AND COMMUNICATION DEVICE AND STORAGE MEDIUM

CROSS-REFERENCE TO RELATED APPLICATION

This application is a U.S. national phase application of International Application No. PCT/CN2021/101055, filed on Jun. 18, 2021, the content of which is hereby incorporated by reference in its entirety.

TECHNICAL FIELD

The disclosure relates to a wireless communication technical field but is not limited to the wireless communication technical field, in particular to an information transmission method, an information transmission apparatus, a communication device and a storage medium.

BACKGROUND

Vehicle to Everything (V2X) technology is a new generation of information and communication technology that connects the vehicle to everything. V2X can provide two kinds of communication interfaces, i.e., Uu (UE-UTRAN) interface (cellular communication interface) and PC5 (Power Class 5) interface (SideLink (SL) interface).

The demand for mobile communication spectrum is increasing, but the actual spectrum that can be allocated for use is gradually decreasing. For the existing licensed frequency bands, simultaneous transmission of New Radio (NR) licensed spectrum service and NR V2X service on the licensed spectrum is a major demand nowadays. It will be a very common scenario for terminals to perform NR licensed spectrum service and NR SL service on the same frequency band at the same time.

SUMMARY

Accordingly, embodiments of the disclosure provide an information transmission method, an information transmission apparatus, a communication device and a storage medium.

According to a first aspect of embodiments of the disclosure, an information transmission method is performed by a user equipment (UE). The method includes:

transmitting power indication information, in which the power indication information indicates UE power classes of a plurality of interfaces in a working frequency band.

According to a second aspect of embodiments of the disclosure, an information transmission method is performed by a base station. The method includes:

receiving power indication information transmitted by a UE; and determining UE power classes of a plurality of interfaces in a working frequency band based on the power indication information.

According to a third aspect of embodiments of the disclosure, a communication device is provided. The device includes: a processor, and a memory storing programs executable by the processor. The processor is configured to perform the information transmission method according to the first aspect or the second aspect.

According to a fourth aspect of embodiments of the disclosure, a storage medium having executable programs stored thereon is provided. When the executable programs are executed by a processor, the processor is caused to perform the information transmission method according to the first aspect or the second aspect.

It should be understood that the above general description and the following detailed descriptions are exemplary and explanatory only and do not limit the embodiments of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the embodiments of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the embodiments of the disclosure. The singular forms of "a" and "the" used in the embodiments of the disclosure and appended claims are also intended to include plural forms, unless the context clearly indicates other meanings. It should also be understood that the term "and/or" as used herein refers to and includes any or all possible combinations of one or more associated listed items.

It is understandable that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

Figure 1:
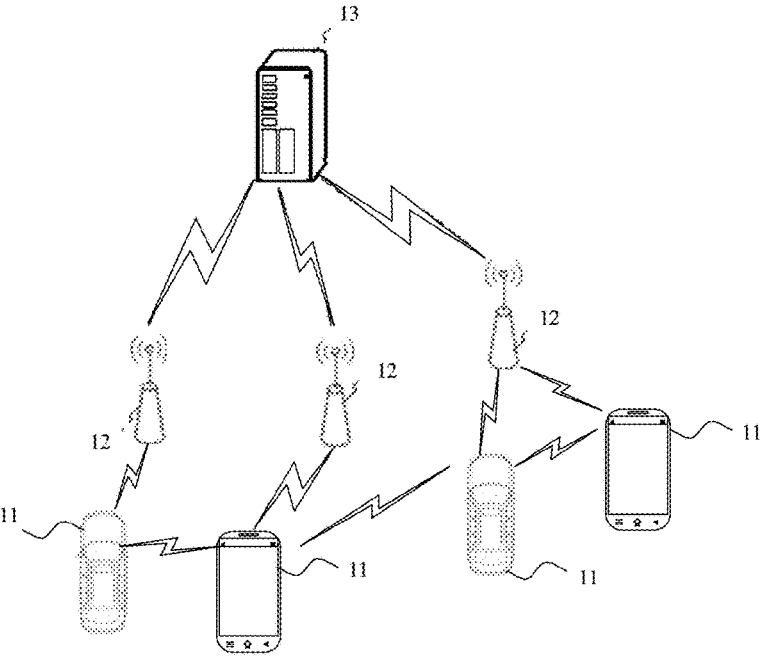
FIG. 1 is a schematic diagram of a wireless communication system according to an exemplary embodiment.

FIG. 1 is a schematic diagram of a wireless communication system provided by an embodiment of the disclosure. As illustrated in FIG. 1, the wireless communication system is a communication system based on the cellular mobile communication technology. The wireless communication system may include: a plurality of terminals 11 and a plurality of base stations 12.

The terminal 11 may be a device that provides voice and/or data connectivity to a user. The terminal 11 may communicate with one or more core networks via a Radio Access Network (RAN). The terminal 11 may be an Internet of Things (IoT) terminal, such as a sensor device, a cell phone (or "cellular" phone), and a computer with the IoT terminal. For example, the terminal 11 may be a stationary, portable, pocket-sized, handheld, computer-built, or vehicle-mounted device, such as, a Station (STA), a subscriber unit, a subscriber station, a mobile station, a mobile, a remote station, an access point, a remote terminal, an access terminal, a user terminal, a user agent, a user device, or a UE. Alternatively, the terminal 11 may be an unmanned aerial vehicle device. Alternatively, the terminal 11 may be an in-vehicle device, for example, an electronic control unit (ECU) having a wireless communication function, or a wireless communication device externally connected to the ECU. Alternatively, the terminal 11 can also be a roadside device having a wireless communication function, for example, a street light, a signal light, or the like.

The base station 12 may be a network side device in the wireless communication system. The wireless communication system may be a 4th Generation (4G) mobile communication system, also known as a Long Term Evolution (LTE) system. Alternatively, the wireless communication system may also be a 5G system, also known as a new radio (NR) system or a 5G NR system. Alternatively, the wireless communication system may be any next generation system of the 5G system. The access network in the 5G system may be called New Generation-RAN (NG-RAN) or machine type communication (MTC) system.

The base station 12 can be an evolved base station (eNB) employed in the 4G system. Alternatively, the base station 12 may be a base station (gNB) with a centralized distributed architecture employed in the 5G system. When the base station 12 adopts the centralized distributed architecture, it usually includes a Central Unit (CU) and at least two Distributed Units (DUs). The CU is equipped with a protocol stack of a Packet Data Convergence Protocol (PDCP) layer, a Radio Link Control (RLC) layer, or a Media Access Control (MAC) layer. The DU is equipped with a protocol stack of a physical (PHY) layer, and the specific implementation of the base station 12 is not limited in the embodiments of the disclosure.

A wireless connection can be established between the base station 12 and the terminal 11 via a wireless air interface. In different implementations, the wireless air interface is a wireless air interface based on the 4G standard. Alternatively, the wireless air interface is a wireless air interface based on the 5G standard, such as a NR. Alternatively, the wireless air interface may also be a wireless air interface based on the standard of the next generation of 5G.

In some embodiments, an End to End (E2E) connection can also be established between the terminals 11 in scenarios, such as, Vehicle to Vehicle (V2V) communication, Vehicle to Infrastructure (V2I) communication, and Vehicle to Pedestrian (V2P) communication in V2X communication.

In some embodiments, the above wireless communication system may also include a network management device 13.

The plurality of base stations 12 are connected to the network management device 13 respectively. The network management device 13 may be a core network device in the wireless communication system, for example, a Mobility Management Entity (MME) in an Evolved Packet Core (EPC). Alternatively, the network management device may be other core network devices, such as a Serving GateWay (SGW), a Public Data Network GateWay (PGW), a Policy and Charging Rules Function (PCRF), or a Home Subscriber Server (HSS), etc. The implementation form of the network management device 13 is not limited in the embodiments of the disclosure.

Execution objects involved in the embodiments of the disclosure include, but are not limited to, UEs such as cell phone terminals that support the cellular mobile communication, and base stations, etc.

One application scenario of the embodiments of the disclosure is that the UE such as the terminal can report an output power of a wireless signal. For example, the UE can use ue-PowerClass to report the output power of the UE. The reported output power is based on one frequency band, i.e., the UE can report the output power in one frequency band. The UE usually reports the output power in the form of power class. The power classes include power class 2 (PC2), power class 3 (PC3), etc., in which PC3 indicates that the maximum power is 23 dBm, and PC2 indicates that the maximum power is 26 dBm. When the UE performs NR licensed spectrum service and NR SL service on the same frequency band simultaneously, the output power is reported based on the power class of its licensed spectrum service without taking into account the power class of the NR SL service.

For example, the power class of the licensed spectrum service on an NR Uu interface can be PC3, or can be PC2 or the like. Meanwhile, the power class of its NR SL service can be PC3 or can be PC2 (with the maximum power of 26 dBm) or the like. The power class depends on a specific design and a capability of the UE. In the related art, there may be different cases of Uu interface power class, PC5 interface power class and reported UE power class as shown in Table 1.

TABLE 1

| | Uu interface UE power class | PC5 interface UE power class | reported total UE power class | problems |
|---|---|---|---|---|
| Case 1 | PC3 | PC3 | PC2 | the actual total UE power class may reach PC2 or PC3, and the power class reported does not correctly reflect the actual situation of the UE in the related art |
| Case 2 | PC3 | PC2 | PC3 | the power class reported does not accurately reflect the PC5 interface power class in the related art |
| Case 3 | PC2 | PC3 | PC2 | the power class reported does not accurately reflect the PC5 interface power class in by the related art |
| Case 4 | PC2 | PC2 | PC2 | the actual total UE power class may reach PC1.5, and the power class reported does not correctly reflect the actual situation of the UE in the related art |

As shown in the above table, when the NR licensed spectrum service and the NR SL service are carried out simultaneously on the same frequency band, the method of reporting a power class in the related art cannot reflect the actual situation of the UE. Therefore, how to accurately report the actual UE power class is a problem to be solved urgently.

Figure 2:
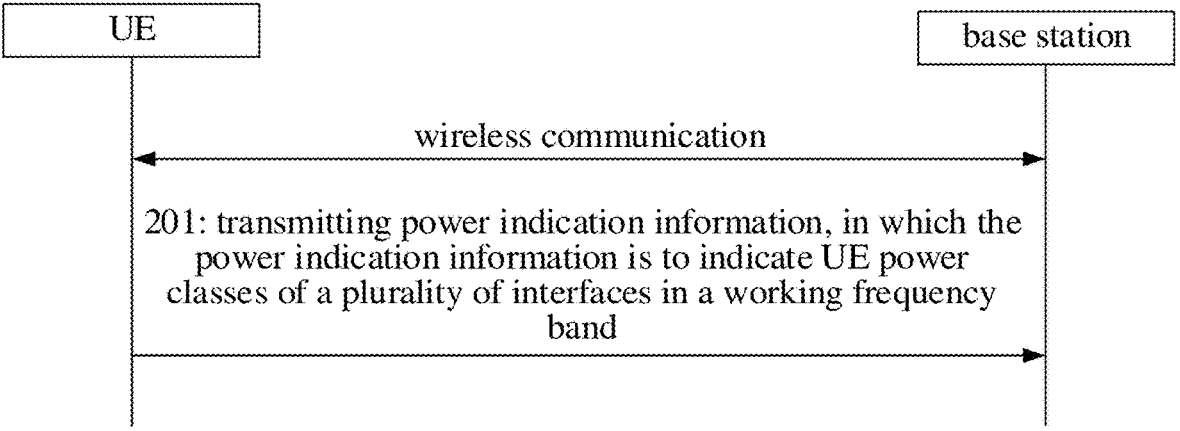
FIG. 2 is a flowchart of an information transmission method according to an exemplary embodiment.

As illustrated in FIG. 2, an exemplary embodiment provides an information transmission method, which may be applied to a UE in a cellular mobile communication system. The method includes the following steps.

At step 201, power indication information is transmitted, in which the power indication information is to indicate UE power classes of multiple interfaces in a working frequency band.

The UE may be a cell phone UE that uses the cellular mobile communication technology for wireless communication. An access network device may be a base station that provides an access network interface to the UE in the cellular mobile communication system.

For example, the power indication information indicates the UE power class of each interface in the working frequency band. Alternatively, the power indication information indicates the UE power class of each interface via which the UE will perform operations in the working frequency band.

The UE power class may be used for the base station to determine, for example, an uplink transmit power value, a transmit power of an SL transmission or the like.

The uplink transmit power of the UE can be classified by power class. For example, the transmit power of PC3 is 23 dBm, the transmit power of PC2 is 26 dBm, and so on.

The UE can communicate with an opposite UE and/or a base station via different interfaces in the working frequency band. The different interfaces may be wireless communication channels realized via different communication protocols. The working frequency band may be a partially configured Bandwidth Part (BWP). The UE can communicate with the opposite UE and/or the base station via multiple interfaces in the working frequency band.

In an embodiment, the interface includes: a Uu interface and/or an SL PC5 interface.

For example, for a working frequency band of the V2X communication, the UE can communicate with the base station through the Uu interface in the working frequency band, and the UE can also communicate with other UEs through the SL PC5 interface in the working frequency band.

In the related art, the UE can report the UE power class based on the working frequency band. The UE reports its total UE power class of the working frequency band, and thus the base station cannot determine the power classes of different interfaces based on the total UE power class of the working frequency band.

The UE power class may be the power class used by the UE when transmitting a signal through each interface. The UE can report the UE power classes of multiple interfaces in the working frequency band. The access network device determines the UE power classes of the multiple interfaces based on the information reported by the UE.

The UE may transmit the power indication information for indicating the UE power classes of multiple interfaces to the base station. An existing uplink signaling can be used to carry the power indication information. For example, the power indication information can be carried in random access message 3 (Msg 3), Media Access Control-Control Element (MAC-CE), Radio Resource Control (RRC) or other signaling. The power indication information can also be carried by a dedicated uplink signaling.

The access network device may determine the UE power class of each interface based on the power indication information in the uplink signaling. The access network device can configure a power parameter, a resource parameter, etc. for each interface based on the power class of the interface, which reduces problems such as power parameter configuration errors caused by inability to determine the power class of the interface.

In this way, the UE reports the UE power classes of multiple interfaces in the working frequency band, and the base station can determine the UE power class of each interface. Therefore, an accuracy of the base station in determining the UE power classes of different interfaces is improved, and problems such as UE power parameter configuration errors caused by inability to accurately determine the UE power class of the interface can be reduced.

In an embodiment, the power indication information is further to indicate a total UE power class of the working frequency band.

The total UE power class can be the total power class of the UE when the UE transmits signals through multiple interfaces in the working frequency band. Since the total UE power class of the working frequency band is not a simple sum of the UE power classes of the multiple interfaces, a maximum transmit power of the UE, intra-frequency interference, time-domain locations of transmissions on different interfaces and other situations should be considered. The total UE power class can be the same as the UE power class of the interfaces, or the total UE power class can be greater than the UE power classes of the interfaces. For example, the UE power classes of two interfaces in the working frequency band are both PC3, and the total UE power class of the working frequency band can be PC2 or PC3. Therefore, the UE can also report the total UE power class of the working frequency band.

The UE communicates on the Uu interface and the PC5 interface simultaneously, and due to the limitation of a maximum power of a wireless power amplifier of the UE, the total UE power class of the UE in the working frequency band is limited. For example, the total UE power class is PC2. If the UE communicates on the Uu interface and the PC5 interface simultaneously at their respective maximum powers, and the total accumulated power exceeds the power value defined by the total UE power class, the UE may reduce the total power of the working frequency band by time-divisionally performing communications on the Uu interface and the PC5 interface, or by reducing the power of the Uu interface and/or the PC5 interface to a lower class, such that the total power at the same time is equal to or less than the power value defined by the total UE power class.

For example, the power indication information reported by the UE may indicate UE power classes and a total UE power class of the working frequency band as shown in Table 2.

TABLE 2

| Uu interface UE power class | PC5 interface UE power class | total UE power class of the working frequency band |
|---|---|---|
| PC3 | PC3 | PC3 |
| PC3 | PC3 | PC2 |
| PC3 | PC2 | PC2 |
| PC2 | PC3 | PC2 |
| PC2 | PC2 | PC2 |

In this way, the UE reports the UE power classes of multiple interfaces in the working frequency band and the total UE power class of the working frequency band, the base station can determine the UE power class of each interface in the working frequency band and the total UE power class. Therefore, by explicitly indicating the UE power classes of multiple interfaces in the working frequency band, an accuracy of the base station in determining the UE power class is improved, and parameter configuration errors due to inability to accurately determine the power class can be reduced.

Figure 3:
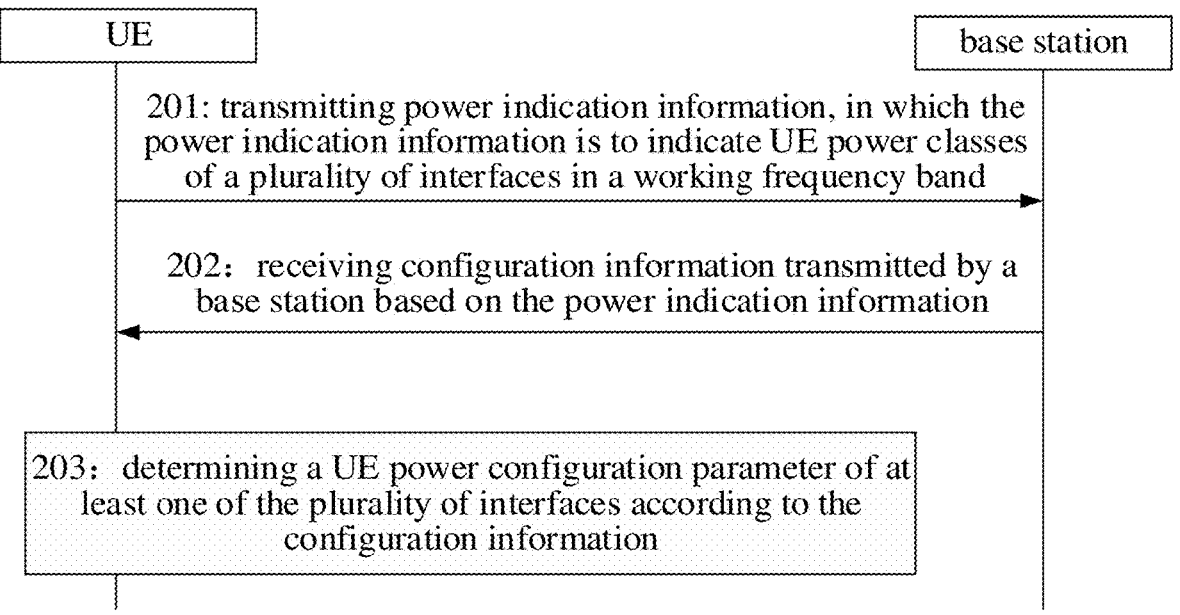
FIG. 3 is a flowchart of an information transmission method according to an exemplary embodiment.

In an embodiment, as shown in FIG. 3, the method further includes the following steps.

At step 202, configuration information transmitted by a base station based on the power indication information is received.

At step 203, a UE power configuration parameter of at least one of the multiple interfaces is determined based on the configuration information.

The access network device may adjust the UE power configuration parameters of the interfaces based on the determined UE power class of the interfaces and the total UE power class of the working frequency band. The UE power configuration parameter can be used to, but is not limited to, adjust the power of the interface, and configure time domain resources on which the interfaces operate.

By adjusting the UE power configuration parameter, the power output of the UE can satisfy actual communication needs and comply with communication specifications.

In an embodiment, the UE power configuration parameter includes at least one of:

a maximum configuration power;

a permissible power back-off; and an SAR regulation strategy.

Based on the actual communication needs, the base station can configure a maximum transmit power of each interface and obtain a maximum configuration power. For example, an appropriate maximum configuration power may be configured for the UE based on requirements on a signal quality and/or power consumption.

Power back-off refers to rolling back an input power of a power amplifier from 1 dB compression point, i.e., 1 dB gain point, to a preset value, such as 6-10 dB, so that the power amplifier keeps working in a linear operating area. The base station can configure the signal transmission power amplifier of the UE based on the UE power class of each interface and the total UE power class of the working frequency band, so that the signal transmission power amplifier of the UE keeps working in the linear operating area.

SAR is an indicator in UE design that measures the amount of radiation to human body when the UE transmits a wireless signal. The UE power class for the UE to transmit the signal cannot exceed a radiation requirement indicated by SAR. When multiple interfaces are working at the same time, in certain event windows, for example, when communications are performed via multiple interfaces at the maximum power at the same time, the total UE power class may exceed the radiation requirement indicated by SAR. The base station can adjust the SAR regulation strategy, for example, adjusting a signal transmission resource of each interface, based on the determined UE power class of each interface and the total UE power class of the working frequency band, to reduce a situation where the radiation of the UE exceeds the SAR requirement due to the high total power in the working frequency band. For example, a transmission time domain of each interface can be adjusted, so that the transmission time domains of respective interfaces are not overlapped, thereby reducing the total UE power class of the working frequency band.

In an embodiment, the method further includes:

receiving a communication capability reporting request transmitted by the base station; and in response to the communication capability reporting request, transmitting communication capability information, in which the communication capability information is to indicate whether the UE is able to use more than one interface for data transmission in the working frequency band.

The communication capability may include, but is not limited to, a multi-interface communication capability of the UE.

Figure 4:
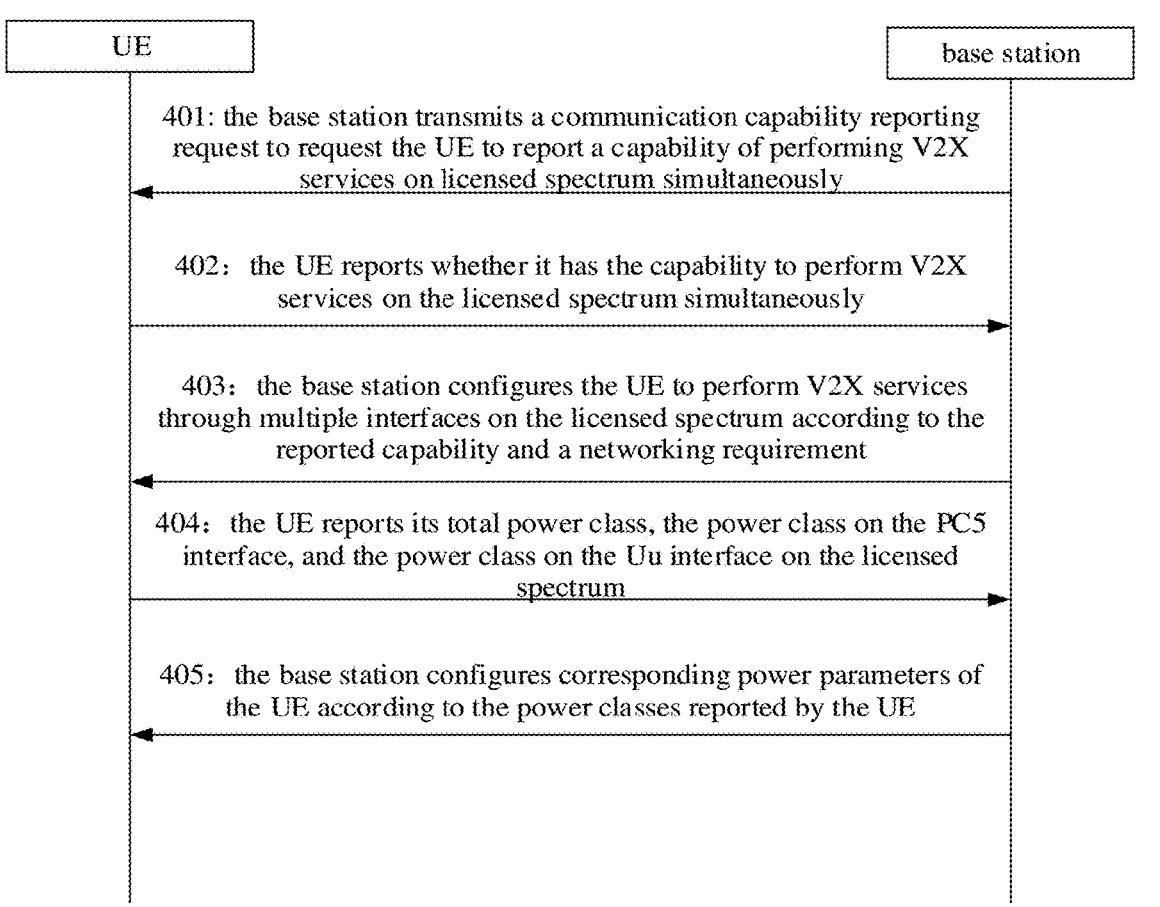
FIG. 4 is a schematic diagram of interaction between a base station and a UE according to an exemplary embodiment.

As illustrated in FIG. 4, when the base station controls the UE to perform V2X services, the specific interaction steps of the base station and the UE may include the following steps.

At step 401, the base station transmits a communication capability reporting request to request the UE to report a capability of performing V2X services on licensed spectrum simultaneously.

The base station can transmit the communication capability reporting request before the UE is controlled to perform V2X services.

At step 402, the UE reports whether it has the capability to perform V2X services on the licensed spectrum simultaneously.

After receiving the communication capability reporting request, the UE reports the communication capability information to the base station to indicate available interfaces that can be adopted on the licensed spectrum.

For example, the base station may transmit the communication capability reporting request before the V2X communication the controlled UE is established, and the UE may report the communication capability information to the base station after receiving the communication capability reporting request, to indicate that the UE can communicate over the Uu interface and the SL PC5 interface on the licensed spectrum, i.e., the working frequency band.

At step 403, the base station configures the UE to perform V2X services through multiple interfaces on the licensed spectrum according to the reported capability and a networking requirement. That is, the base station configures the Uu interface for the NR communication service and the PC5 interface for the SL communication service for the UE in the same licensed frequency band.

At step 404, the UE reports its total UE power class (i.e., ue-PowerClass-IntraConcurent), the UE power class on the PC5 interface (i.e., ue-PowerClassPC5), and the UE power class on the Uu interface (i.e., ue-PowerClassUu) on the licensed spectrum. Examples of possible reported UE power classes are shown in Table 2.

At step 405, the base station configures corresponding power parameters of the UE according to the power classes reported by the UE. Based on the total UE power class, the UE power class on the PC5 interface, and the UE power class on the Uu interface reported by the UE, the base station configures the corresponding maximum configuration powers, the permissible power back-off, and the SAR regulation strategies and other indicators for the PC5 interface and the Uu interface respectively.

In this way, in the V2X service, the UE reports its total UE power class of the working frequency band and the UE power class of each interface, the base station can configures the power of the interface based on the reported power classes, so that the power output of the UE can satisfy the actual communication needs and comply with communication specifications.

Figure 5:
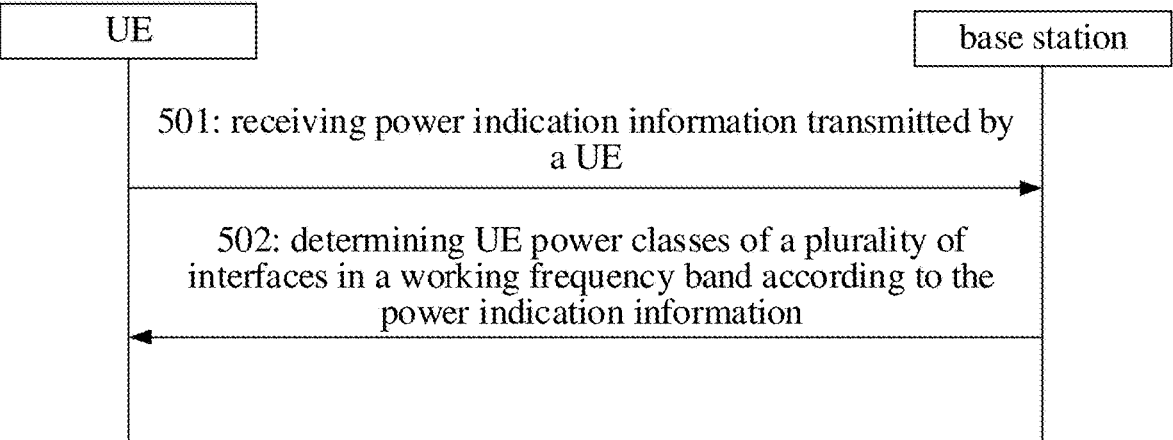
FIG. 5 is a flowchart of an information transmission method according to an exemplary embodiment.

As illustrated in FIG. 5, an exemplary embodiment provides an information transmission method, which may be applied to an access network device in a cellular mobile communication system. The method includes the following steps.

At step 501, power indication information transmitted by a UE is received.

At step 502, UE power classes of multiple interfaces in a working frequency band are determined based on the power indication information.

The UE may be a cell phone UE that uses the cellular mobile communication technology for wireless communication. The access network device may be a base station that provides an access network interface to the UE in the cellular mobile communication system.

For example, the power indication information indicates the UE power class of each interface in the working frequency band. Alternatively, the power indication information indicates the UE power class of each working interface in the working frequency band.

The UE power class may be used for the base station to determine, for example, an uplink transmit power value, a transmit power of an SL transmission or the like.

The uplink transmit power of the UE can be classified by power class. For example, the transmit power of PC3 is 23 dBm, the transmit power of PC2 is 26 dBm, and so on.

The UE can communicate with an opposite UE and/or a base station via different interfaces in the working frequency band. The different interfaces may be wireless communication channels realized via different communication protocols. The working frequency band may be a partially configured BWP. The UE can communicate with the opposite UE and/or the base station via multiple interfaces in the working frequency band.

In an embodiment, the interface includes:

a Uu interface and/or an SL PC5 interface.

For example, for a working frequency band of the V2X communication, the UE can communicate with the base station through the Uu interface in the working frequency band, and the UE can also communicate with other UEs through the SL PC5 interface in the working frequency band.

In the related art, the UE can report the UE power class based on the working frequency band. The UE reports its total UE power class of the working frequency band, and thus the base station cannot determine the power classes of different interfaces based on the total UE power class of the working frequency band.

The UE power class may be the power class used by the UE when the UE transmits a signal via each interface. The UE can report the UE power classes of multiple interfaces in the working frequency band. The access network device determines the UE power classes of the multiple interfaces based on the information reported by the UE.

The UE may transmit the power indication information for indicating the UE power classes of multiple interfaces to the base station. An existing uplink signaling can be used to carry the power indication information. For example, the power indication information can be carried in Msg 3, MAC-CE, RRC or other signaling. The power indication information can also be carried by a dedicated uplink signaling.

The access network device may determine the UE power class of each interface based on the power indication information in the uplink signaling. The access network device can configure a power parameter, a resource parameter, etc. for each interface based on the power class of the interface, which reduces problems such as power parameter configuration errors caused by inability to determine the UE power class of the interface.

In this way, the UE reports the UE power classes of multiple interfaces in the working frequency band, and the base station can determine the UE power class of each interface. Therefore, an accuracy of the base station in determining the UE power classes of different interfaces is improved, and problems such as UE power parameter configuration errors caused by inability to accurately determine the UE power class of the interface can be reduced.

In an embodiment, the method further includes:

determining a total UE power class of the working frequency band according to the power indication information.

The total UE power class can be the total power class of the UE when the UE transmits signals via multiple interfaces in the working frequency band. Since the total UE power class of the working frequency band is not a simple sum of the UE power classes of the multiple interfaces, a maximum transmit power of the UE, intra-frequency interference, time-domain locations of transmissions on different interfaces and other situations should be considered. The total UE power class can be the same as the UE power class of the interfaces, or the total UE power class can be greater than the UE power classes of the interfaces. For example, the UE power classes of two interfaces in the working frequency band are both PC3, and the total UE power class of the working frequency band can be PC2 or PC3. Therefore, the UE can also report the total UE power class of the working frequency band.

The UE communicates on the Uu interface and the PC5 interface simultaneously, and due to the limitation of a maximum power of a wireless power amplifier of the UE, the total UE power class of the UE in the working frequency band is limited. For example, the total UE power class is PC2. If the UE communicates on the Uu interface and the PC5 interface simultaneously at their respective maximum powers, and the total accumulated power exceeds the power value defined by the total UE power class, the UE may reduce the total power of the working frequency band by time-divisionally performing communications on the Uu interface and the PC5 interface, or by reducing the power of the Uu interface and/or the PC5 interface to a lower class, such that the total power at the same time is equal to or less than the power value defined by the total UE power class.

For example, the power indication information reported by the UE may indicate UE power classes and a total UE power class of the working frequency band as shown in Table 2.

In this way, the UE reports the UE power classes of multiple interfaces in the working frequency band and the total UE power class of the working frequency band, the base station can determine the UE power class of each interface in the working frequency band and the total UE power class. Therefore, by explicitly indicating the UE power classes of multiple interfaces in the working frequency band, an accuracy of the base station in determining the UE power class is improved, and parameter configuration errors due to inability to accurately determine the power class can be reduced.

In an embodiment, the method further includes:

determining a UE power configuration parameter of at least one of the interfaces based on the power indication information; and transmitting configuration information for indicating the UE power configuration parameter.

The access network device may adjust the UE power configuration parameters of the interfaces based on the determined UE power classes of each interface and the total UE power class of the working frequency band. The UE power configuration parameter can be used to, but is not limited to, adjust the power of the interface, and configure time domain resources on which the interfaces operate.

By adjusting the UE power configuration parameter, the power output of the UE can satisfy actual communication needs and comply with communication specifications.

In an embodiment, the UE power configuration parameter includes at least one of:

a maximum configuration power;

a permissible power back-off; and an SAR control strategy.

Based on the actual communication needs, the base station can configure a maximum transmit power of each interface and obtain a maximum configuration power. For example, an appropriate maximum configuration power may be configured for the UE based on requirements on a signal quality and/or power consumption.

Power back-off refers to reducing an input power of a power amplifier from 1 dB compression point, i.e., 1 dB gain point, to a preset value, such as 6-10 dB, so that the power amplifier keeps working in a linear operating area. The base station can configure the signal transmission power amplifier of the UE based on the UE power class of each interface and the total UE power class of the working frequency band, so that the signal transmission power amplifier of the UE keeps working in the linear operating area.

SAR is an indicator in UE design that measures the amount of radiation to human body when the UE transmits a wireless signal. The UE power class for the UE to transmit the signal cannot exceed a radiation requirement indicated by SAR. When multiple interfaces are working at the same time, in certain event windows, for example, when communications are performed via multiple interfaces at the maximum power at the same time, the total UE power class may exceed the radiation requirement indicated by SAR. The base station can adjust the SAR regulation strategy, for example, adjusting a signal transmission resource of each interface, based on the determined UE power class of each interface and the total UE power class of the working frequency band, to reduce a situation where the radiation of the UE exceeds the SAR requirement due to the high total power in the working frequency band. For example, a transmission time domain of each interface can be adjusted, so that the transmission time domains of respective interfaces are not overlapped, thereby reducing the total UE power class of the working frequency band.

In an embodiment, the method further includes:

transmitting a communication capability reporting request to the UE;

receiving communication capability information transmitted by the UE in response to the communication capability reporting request; and determining whether the UE is able to use more than one interface for data transmission in the working frequency band according to the communication capability information.

The communication capability may include, but is not limited to, a multi-interface communication capability of the UE.

As illustrated in FIG. 4, when the base station controls the UE to perform V2X services, the specific interaction steps of the base station and the UE may include the following steps.

At step 401, the base station transmits a communication capability reporting request to request the UE to report a capability of performing V2X services on licensed spectrum simultaneously.

The base station can transmit the communication capability reporting request before the UE is controlled to perform V2X services.

At step 402, the UE reports whether it has the capability to perform V2X services on the licensed spectrums simultaneously.

After receiving the communication capability reporting request, the UE reports the communication capability information to the base station to indicate available interfaces that can be adopted on the reporting spectrum.

For example, the base station may transmit the communication capability reporting request before the V2X communication controlling the UE is established, and the UE may report the communication capability information to the base station after receiving the communication capability reporting request, to indicate that the UE can communicate over the Uu interface and the SL PC5 interface on the licensed spectrum, i.e., the working frequency band.

At step 403, the base station configures the UE to perform V2X services through multiple interfaces on the licensed spectrum according to the reported capability and a networking requirement. That is, the base station configures the Uu interface for the NR communication service and the PC5 interface for the SL communication service for the UE in the same licensed frequency band.

At step 404, the UE reports its total UE power class (i.e., ue-PowerClass-IntraConcurrent), the UE power class on the PC5 interface (i.e., ue-PowerClassPC5), and the UE power class on the Uu interface (i.e., ue-PowerClassUu) on the licensed spectrum. Examples of possible reported UE power classes are shown in Table 2.

At step 405, the base station configures corresponding power parameters of the UE according to the power classes reported by the UE. Based on the total UE power class, the UE power class on the PC5 interface, and the UE power class on the Uu interface reported by the UE, the base station configures the corresponding maximum configuration powers, the permissible power back-off, and the SAR regulation strategies and other indicators for the PC5 interface and the Uu interface respectively.

In this way, in the V2X service, the UE reports its total UE power class of the working frequency band and the UE power class of each interface, the base station can configures the power of the interface based on the reported power classes, so that the power output of the UE can satisfy the actual communication needs and comply with communication specifications.

A specific example is provided below in combination with any of the above embodiments.

The UE reports whether or not it has the capability to perform V2X services simultaneously on the licensed spectrum.

Based on the capability reported by the UE and an actual networking requirement, the base station issues an instruction to the UE to require it to simultaneously transmit V2X services on the licensed spectrum.

The UE reports the following power classes on the same licensed frequency band:

1. a total UE power class for Intra-band Concurrent Operation;
2. a power class on the PC5 interface; and
3. a power class on the Uu interface.

The network configures the maximum transmit power, the power back-off, and other corresponding indicators of the UE on each interface according to the total UE power class, the UE power class on the PC5 interface, and the UE power class on the Uu interface reported by the UE.

The flowchart of the interaction between the UE and the base station is shown in FIG. 4.

Embodiment 1

At step 401, the base station transmits a communication capability reporting request to request the UE to report a capability of performing V2X services on licensed spectrum simultaneously.

At step 402, the UE reports whether it has the capability to perform V2X services on the licensed spectrum simultaneously.

Embodiment 2

At step 403, the base station configures the UE to perform V2X services through multiple interfaces on the licensed spectrum according to the reported capability and a networking requirement. That base station configures the Uu interface for the NR communication service and the PC5 interface for the SL communication service for the UE in the same licensed frequency band according to the reported capability and the networking requirement.

Embodiment 3

At step 404, the UE reports its total UE power class (i.e., ue-PowerClass-IntraConcurent), the UE power class on the PC5 interface (i.e., ue-PowerClassPC5), and the UE power class on the Uu interface (i.e., ue-PowerClassUu) on the licensed spectrum. Examples of possible reported UE power classes are shown in Table 2.

Embodiment 4

At step 405, the base station configures corresponding power parameters of the UE according to the power classes reported by the UE. Based on the total UE power class, the UE power class on the PC5 interface, and the UE power class on the Uu interface reported by the UE, the base station configures the corresponding maximum configuration powers, the permissible power back-off, and the SAR regulation strategies and other indicators for the PC5 interface and the Uu interface respectively.

Figure 6:
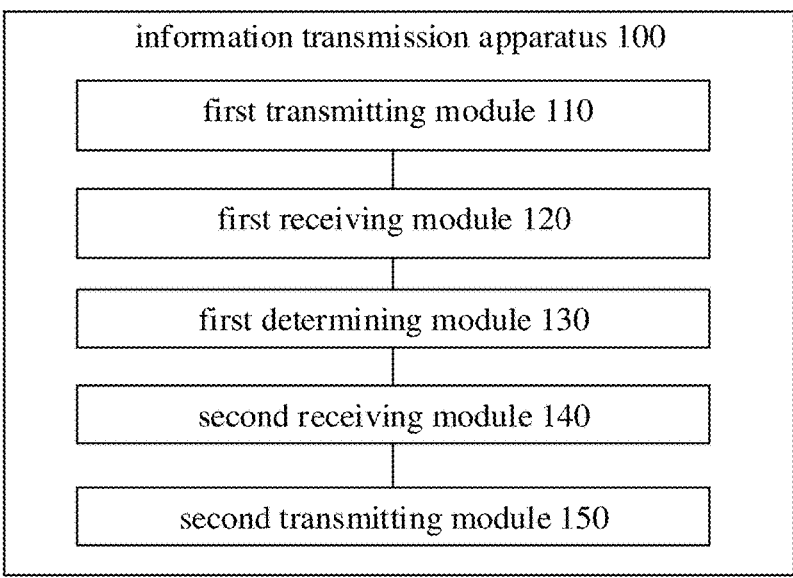
FIG. 6 is a block diagram of an information transmission apparatus according to an exemplary embodiment.

The embodiments of the disclosure also provide an information transmission apparatus, applied to a UE for the wireless communication. As illustrated in FIG. 6, the information transmission apparatus 100 includes: a first transmitting module 110.

The first transmitting module 110 is configured to transmit power indication information, in which the power indication information is to indicate UE power classes of a plurality of interfaces in a working frequency band.

In an embodiment, the power indication information is to indicate a total UE power class of the working frequency band.

In an embodiment, the apparatus 100 further includes:

a first receiving module 120, configured to receive configuration information transmitted by a base station based on the power indication information; and a first determining module 130, configured to determine a UE power configuration parameter of at least one of the plurality of interfaces based on the configuration information.

In an embodiment, the UE power configuration parameter includes at least one of:

a maximum configuration power;

a permissible power back-off; and an SAR regulation strategy.

In an embodiment, the apparatus 100 further includes:

a second receiving module 140, configured to receive a communication capability reporting request transmitted by a base station; and a second transmitting module 150, configured to, in response to the communication capability reporting request, transmit communication capability information, in which the communication capability information is to indicate whether the UE is able to use more than one interface for data transmission in the working frequency band.

In an embodiment, the interface includes:

a Uu interface and/or an SL PC5 interface.

Figure 7:
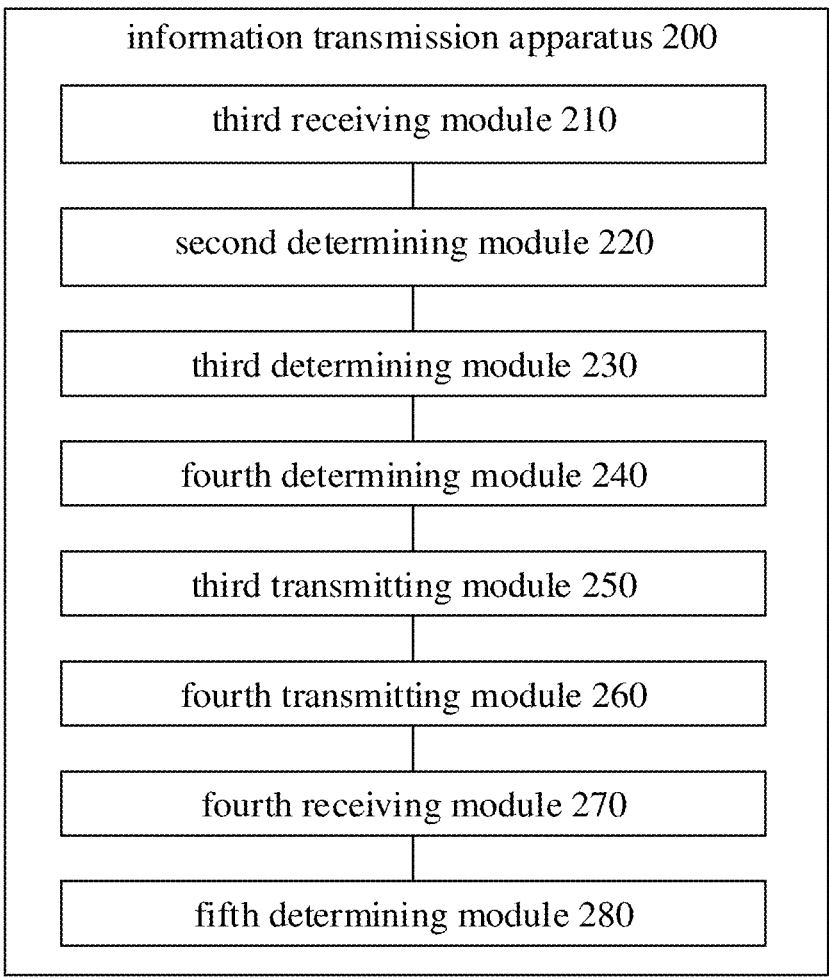
FIG. 7 is a block diagram of an information transmission apparatus according to an exemplary embodiment.

The embodiments of the disclosure also provide an information transmission apparatus, applied to a base station for wireless communication. As illustrated in FIG. 7, the information transmission apparatus 200 includes: a third receiving module 210 and a second determining module 220.

The third receiving module 210 is configured to receive power indication information transmitted by a UE.

The second determining module 220 is configured to determine UE power classes of a plurality of interfaces in a working frequency band based on the power indication information.

In an embodiment, the apparatus 200 further includes:

a third determining module 230, configured to determine a total UE power class of the working frequency band based on the power indication information.

In an embodiment, the apparatus 200 further includes:

a fourth determining module 240, configured to determine a UE power configuration parameter of at least one of the plurality of interfaces based on the power indication information; and a third transmitting module 250, configured to transmit configuration information for indicating the UE power configuration parameter to the UE.

In an embodiment, the UE power configuration parameter includes at least one of:

a maximum configuration power;

a permissible power back-off; and an SAR regulation strategy.

In an embodiment, the apparatus 200 further includes:

a fourth transmitting module 260, configured to transmit a communication capability reporting request to the UE;

a fourth receiving module 270, configured to receive communication capability information transmitted by the UE in response to the communication capability reporting request; and a fifth determining module 280, configured to determine whether the UE is able to use more than one interface for data transmission in the working frequency band based on the communication capability information.

In an embodiment, the interface includes:

a Uu interface and/or an SL PC5 interface.

In an exemplary embodiment, the first transmitting module 110, the first receiving module 120, the first determining module 130, the second receiving module 140, the second transmitting module 150, the third receiving module 210, the second determining module 220, the third determining module 230, the fourth determining module 240, the third transmitting module 250, the fourth transmitting module 260, the fourth receiving module 270, and the fifth determining module 280 may be implemented by one or more Central Processing Units (CPUs), Graphics Processing Units (GPUs), Baseband Processors (BPs), Application Specific Integrated Circuits (ASICs), Digital Signal Processors (DSPs), Programmable Logic Devices (PLDs), Complex Programmable Logic Devices (CPLDs), Field-Programmable Gate Arrays (FPGAs), general processors, controllers, Micro Controller Units (MCUs), microprocessors or other electronic components, for implementing the above methods.

Figure 8:
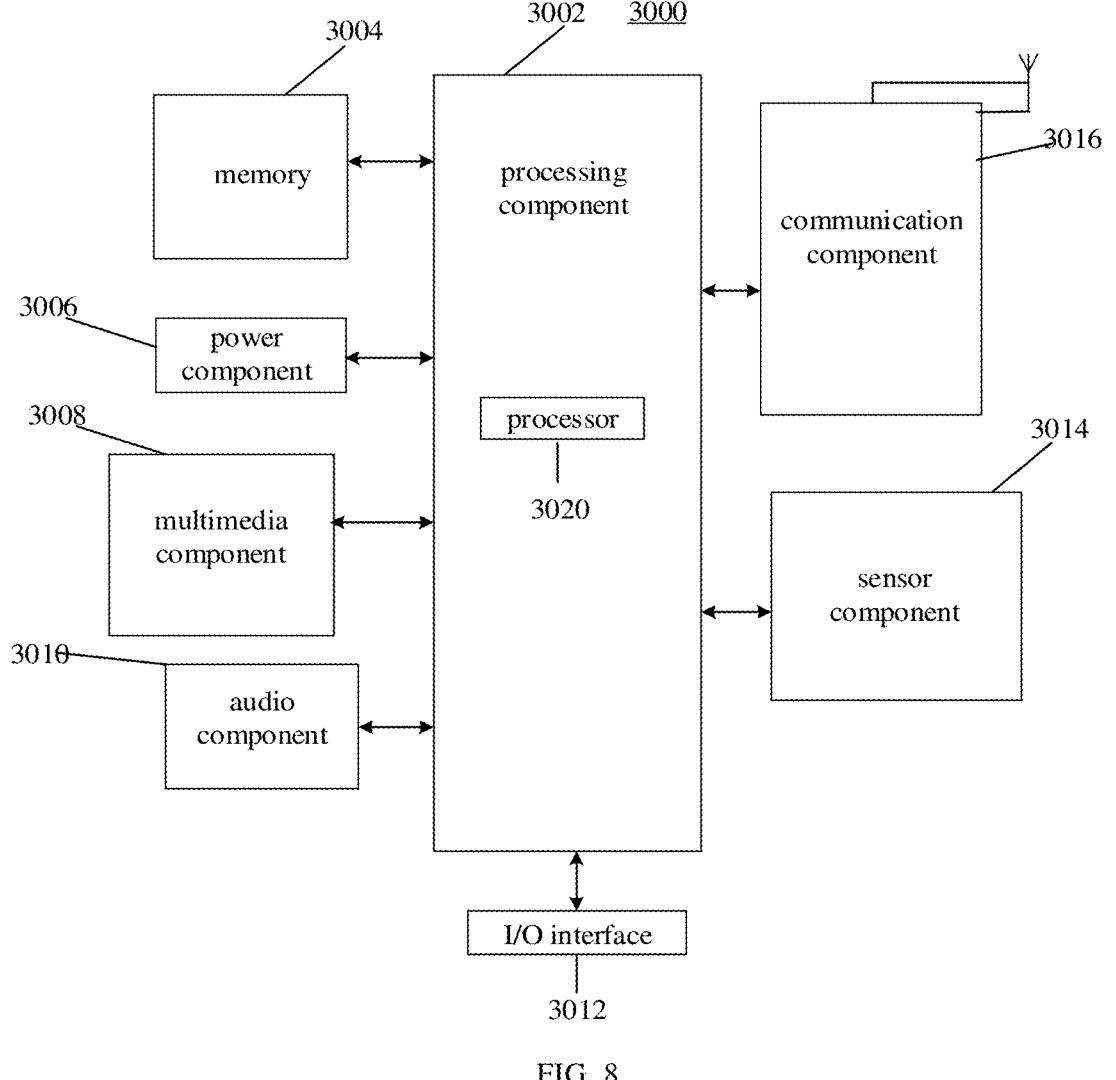
FIG. 8 is a block diagram of a device for transmitting information according to an exemplary embodiment.

FIG. 8 is a block diagram of a device 3000 for transmitting information according to an exemplary embodiment. For example, the device 3000 may be a mobile phone, a computer, a digital broadcasting terminal, a message transceiver device, a game console, a tablet device, a medical device, a fitness device and a personal digital assistant.

As illustrated in FIG. 8, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3020 to execute instructions to implement all or part of the steps in the above described methods. Moreover, the processing component 3002 may include one or more modules which facilitate the interaction between the processing component 3002 and other components. For example, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000, contact data, phonebook data, messages, pictures, video, etc. The memory 3004 may be implemented using any type of volatile or nonvolatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 3008 includes a front-facing camera and/or a rear-facing camera. When the device 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC) configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an open/closed status of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a Complementary Metal Oxide Semiconductor (CMOS) or Charge-Coupled Device (CCD) image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as Wi-Fi, 2G or 3G, or a combination thereof. In an exemplary embodiment, the communication component 3016 receives a broadcast signal or broadcast associated information from an external broadcast management system via a broadcast channel. In an exemplary embodiment, the communication component 3016 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 3000 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described methods.

In an exemplary embodiment, there is also provided a non-transitory computer readable storage medium including executable instructions, such as the memory 3004. The above instructions may be executed by the processor 3020 in the device 3000, for performing the above methods. For example, the non-transitory computer-readable storage medium may be a ROM, a Random Access Memory (RAM), a CD-ROM, a magnetic tape, a floppy disc, and an optical data storage device.

Other embodiments of the disclosure will be apparent to those skilled in the art from consideration of the specification and practice of the disclosure disclosed here. The disclosure is intended to cover any variations, uses, or adaptations of the embodiments of the disclosure following the general principles thereof and including such departures from the disclosure as come within known or customary practice in the art. It is intended that the specification and embodiments are considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An information transmission method, performed by a user equipment (UE), comprising: transmitting power indication information, wherein the power indication information indicates UE power classes of a plurality of interfaces in a working frequency band; receiving configuration information transmitted by a base station based on the power indication information; and determining a UE power configuration parameter of at least one of the plurality of interfaces based on the configuration information.

2. The method of claim 1, wherein the power indication information further indicates a total UE power class of the working frequency band.

3. The method of claim 1, wherein the UE power configuration parameter comprises at least one of:
   a maximum configuration power;
   a permissible power back-off; or
   a Specific Absorption Rate (SAR) regulation strategy.

4. The method of claim 1, further comprising:
   receiving a communication capability reporting request transmitted by a base station; and
   in response to the communication capability reporting request, transmitting communication capability information, wherein the communication capability information indicates whether the UE is able to use more than one interface for data transmission in the working frequency band.

5. The method of claim 1, wherein an interface comprises at least one of:
   a Uu interface or a sidelink power class 5 (PC5) interface.

6. An information transmission method, performed by a base station, comprising: receiving power indication information transmitted by a user equipment (UE); determining UE power classes of a plurality of interfaces in a working frequency band based on the power indication information; determining a UE power configuration parameter of at least one of the plurality of interfaces based on the power indication information; and transmitting configuration information for indicating the UE power configuration parameter to the UE.

7. The method of claim 6, further comprising:
   determining a total UE power class of the working frequency band based on the power indication information.

8. The method of claim 6, wherein the UE power configuration parameter comprises at least one of:
   a maximum configuration power;
   a permissible power back-off; or
   a Specific Absorption Rate (SAR) regulation strategy.

9. The method of claim 6, further comprising:
   transmitting a communication capability reporting request to the UE;
   receiving communication capability information transmitted by the UE in response to the communication capability reporting request; and
   determining whether the UE is able to use more than one interface for data transmission in the working frequency band based on the communication capability information.

10. The method of claim 6, wherein an interface comprises at least one of:
   a Uu interface or a sidelink power class 5 (PC5) interface.

11. A user equipment (UE), comprising: a processor; and a memory storing programs executable by the processor, wherein the processor is configured to: transmit power indication information, wherein the power indication information indicates UE power classes of a plurality of interfaces in a working frequency band; receive configuration information transmitted by a base station based on the power indication information; and determine a UE power configuration parameter of at least one of the plurality of interfaces based on the configuration information.

12. A non-transitory computer-readable storage medium having executable programs stored thereon, wherein when the executable programs are executed by a processor, the processor is caused to perform the method of claim 1.

13. The UE of claim 11, wherein the power indication information further indicates a total UE power class of the working frequency band.

14. The UE of claim 11, wherein the UE power configuration parameter comprises at least one of:
   a maximum configuration power;
   a permissible power back-off; or
   a Specific Absorption Rate (SAR) regulation strategy.

15. The UE of claim 11, wherein the processor is further configured to:
   receive a communication capability reporting request transmitted by a base station; and
   in response to the communication capability reporting request, transmit communication capability information, wherein the communication capability information indicates whether the UE is able to use more than one interface for data transmission in the working frequency band.

16. The UE of claim 11, wherein the interface comprises at least one of:
   a Uu interface or a sidelink power class 5 (PC5) interface.

17. A base station, comprising:

a processor; and a memory storing programs executable by the processor, wherein the processor is configured to perform the method of claim 6.

* * * * *